(12) United States Patent
Goodman et al.

(10) Patent No.: US 7,893,841 B2
(45) Date of Patent: Feb. 22, 2011

(54) DETERMINING CARTRIDGE CONFLICTS WITH DEEP SLOT TECHNOLOGY

(75) Inventors: Brian G. Goodman, Tucson, AZ (US); Leonard G. Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/051,640

(22) Filed: Mar. 19, 2008

(65) Prior Publication Data

US 2009/0237834 A1 Sep. 24, 2009

(51) Int. Cl.
*G08B 13/14* (2006.01)
(52) U.S. Cl. .............. 340/572.8; 340/572.7; 340/572.1; 360/92.1
(58) Field of Classification Search .............. 340/572.8, 340/573.1, 568.1, 568.2, 572.1, 572.7; 235/380, 235/381, 487, 383; 360/92, 92.1, 93; 709/203, 709/224; 717/111, 112
See application file for complete search history.

(56) References Cited

U.S. PATENT DOCUMENTS

| | | | |
|---|---|---|---|
| 6,201,474 B1 | 3/2001 | Brady et al. | |
| 6,715,031 B2 | 3/2004 | Camble et al. | |
| 6,845,431 B2 | 1/2005 | Camble et al. | |
| 7,092,990 B2 * | 8/2006 | Goodman et al. | ............ 709/203 |
| 7,123,436 B2 * | 10/2006 | Shimanuki | ................. 360/92.1 |
| 2007/0039014 A1 | 2/2007 | Pierce et al. | |
| 2007/0162180 A1 | 7/2007 | Goodman et al. | |

* cited by examiner

*Primary Examiner*—Hung T. Nguyen
(74) *Attorney, Agent, or Firm*—Hamilton & Terrile, LLP; Stephen A. Terrile

(57) ABSTRACT

A library includes a frame, a plurality of cartridge slots disposed within the frame and at least one counter configured to determine the presence of cartridges stored within the plurality of cartridge slots without removing the cartridges. The library also includes at least one controller in communication with the counter and configured to count a number of cartridges within the cartridge slots and compare the counted number to a capacity on demand value.

20 Claims, 11 Drawing Sheets

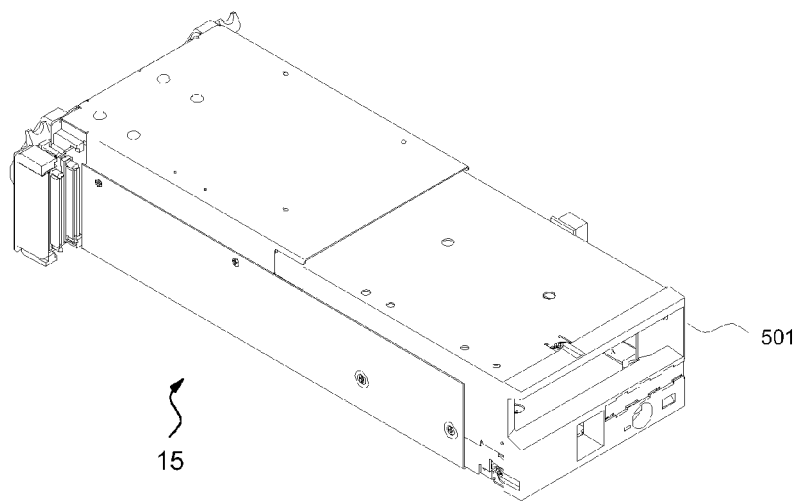
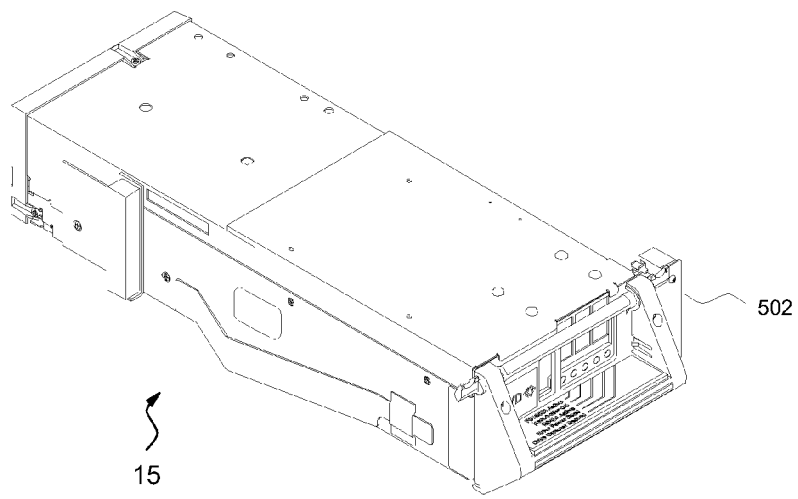
FIG. 5

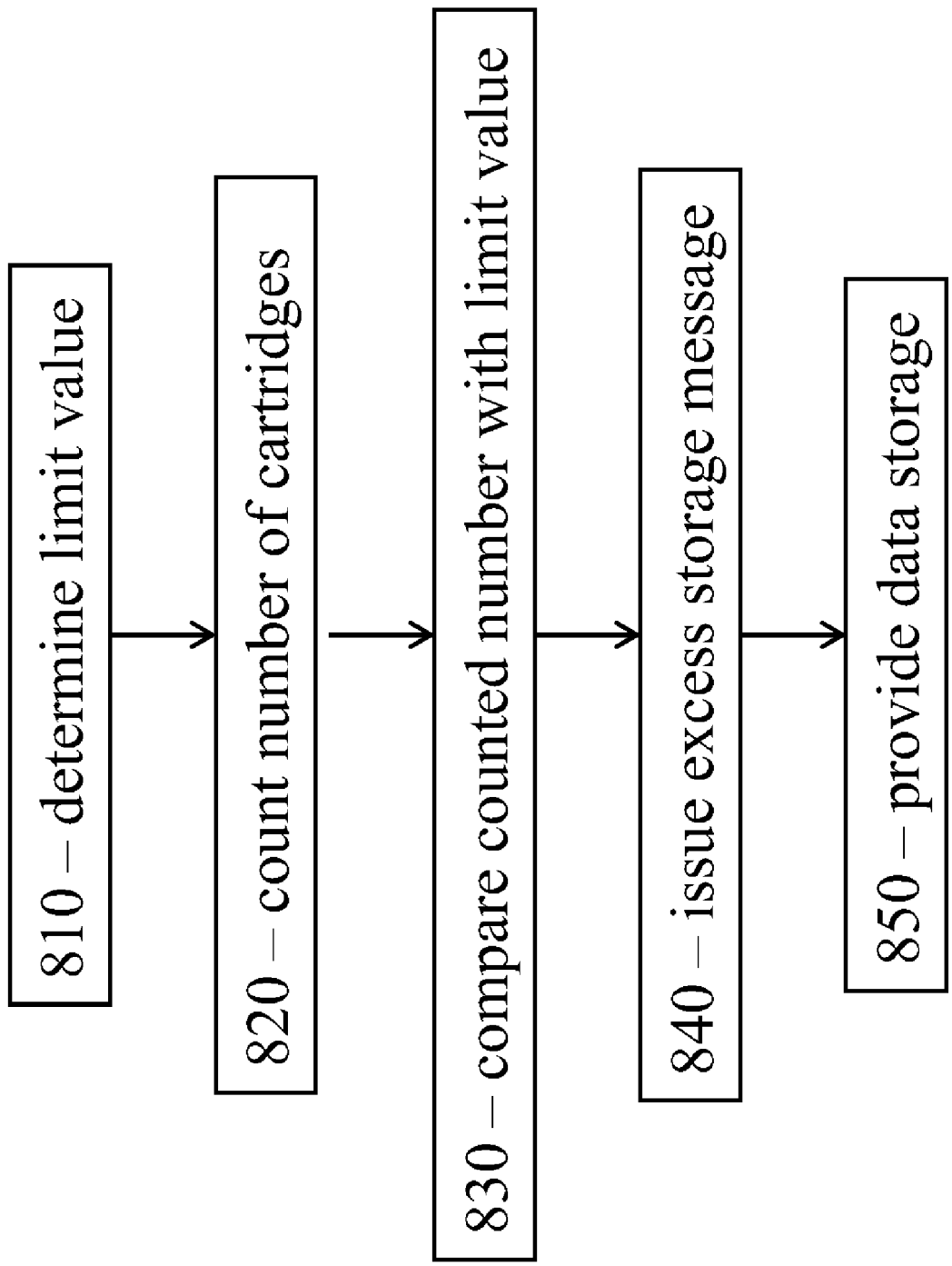

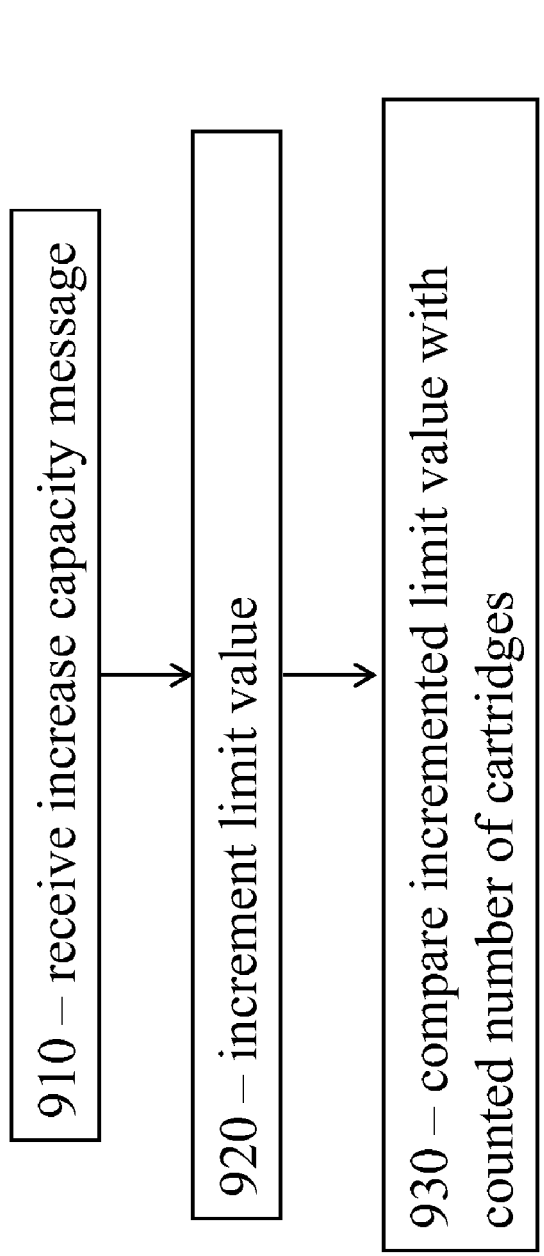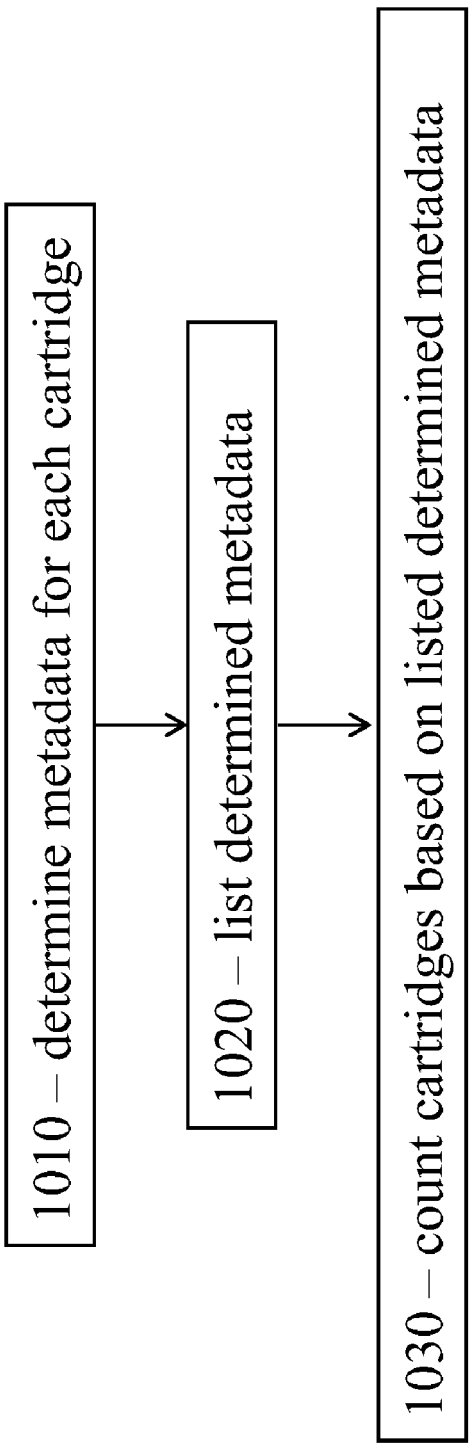
FIG. 9
900
FIG. 10
1000

1100

DETERMINING CARTRIDGE CONFLICTS WITH DEEP SLOT TECHNOLOGY

FIELD OF INVENTION

The present invention generally relates to storage libraries. More specifically, the invention relates to storage libraries with removable media.

BACKGROUND OF THE INVENTION

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transport such media to the data storage drives by moving in the X and Y directions.

In an effort to increase storage capacity, deep slot technology (or deep cartridge slots) allows for storage slots that contain more than a single cartridge. Such storage libraries allow for higher density, or more cartridges stored per square foot. In 'deep slot' libraries, two or more cartridges are arrayed in series so that accessing desired cartridges may require removing cartridges stored in front of the desired cartridge. As used herein, the term "deep slot" refers to a magazine or storage slot including an array of storage slots such that at least two slots are arranged in series such that accessing an interior slot requires traversing at least one exterior slot.

Deep slot technology requires that there be enough free storage space to hold the number of cartridges that can be contained in a deep slot, minus one. This is because the library may have to access the last cartridge in a deep slot, and the cartridges in front of the last cartridge must be moved out of the way. For example, if a library has storage slots that can contain 5 cartridges, then the library will need to be able to place 4 of the 5 cartridges somewhere else, while it accesses the 5th cartridge with a library gripper. This additional required space shall be referred to as "swap space". Swap space may comprise additional storage slots, I/O slots, drive slots, gripper slots, or any other location that may be used to hold a cartridge while another cartridge is being accessed.

One problem with deep slot technology is inventory. This is because, except for the first cartridge, a bar code reader cannot see the cartridge labels in a deep slot without removal. As a result, the library must remove each cartridge to read the label of the cartridge behind it, and to ensure that there are no more cartridges to read. This can be very time consuming, and an operator may be long gone after replacing a magazine, closing a library door, or powering up a library.

What is needed is a quick method of determining that the minimum required number of storage slots are available as swap space in a deep slot library after a magazine has been placed in the library, after a library door has been closed, or after a library reset or power-on.

Furthermore, capacity on demand systems provide vendors the ability to offer their customers more physical storage capacity than the customer has paid for, while allowing an upgrade to storage capacity without installing new hardware. Such systems allow a customer greater flexibility in managing storage requirements. However, with deep slot technology, such systems run the danger to the vendor that a customer could place more cartridges in a capacity on demand system than the customer has paid for, and it would be difficult for the library to detect.

What is needed is a method of determining if more cartridges have been placed in a deep slot library than have been activated with a capacity on demand solution.

It is therefore a challenge to develop strategies for storing cartridges to overcome these, and other, disadvantages.

SUMMARY OF THE INVENTION

One embodiment of the invention provides a library that includes a frame, a plurality of cartridge slots disposed within the frame and at least one counter configured to determine a number of cartridges stored within the plurality of cartridge slots without removing the cartridges from a cartridge slot. The library also includes at least one controller in communication with the counter and configured to count a number of cartridges within the cartridge slots and compare the counted number to a capacity on demand value.

Another embodiment of the present invention is a method for providing data storage that includes determining a capacity on demand value, associated with an allowed storage capacity of a library and counting a number of cartridges within the library, without removing cartridges from the library. The method further includes comparing the counted number of cartridges with the capacity on demand value, issuing an excess storage message based on the comparison, and providing data storage.

Yet another embodiment of the invention provides a method of establishing an inventory of cartridges in a data storage system. The method includes operating a reader to determine at least one metadata associated with each cartridge stored in a library, listing the determined metadata, counting the stored cartridges based on the list without removing cartridges from the library, and determining a capacity on demand value, the capacity on demand value associated with an allowed storage capacity. The method further includes comparing the counted number of cartridges with the capacity on demand value and establishing an inventory based on the metadata.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

BRIEF DESCRIPTION OF THE DRAWINGS

FIG. 5 is an isometric view of the front and rear of a data storage drive canister adaptable to implement an embodiment of the present invention;

FIG. 8 illustrates one embodiment of a method for providing data storage in accordance with one aspect of the invention;

FIG. 9 illustrates one embodiment of a method for providing data storage in accordance with one aspect of the invention;

FIG. 10 illustrates one embodiment of a method for providing data storage in accordance with one aspect of the invention.

DETAILED DESCRIPTION OF THE PRESENT INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges, magnetic disk cartridges, or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
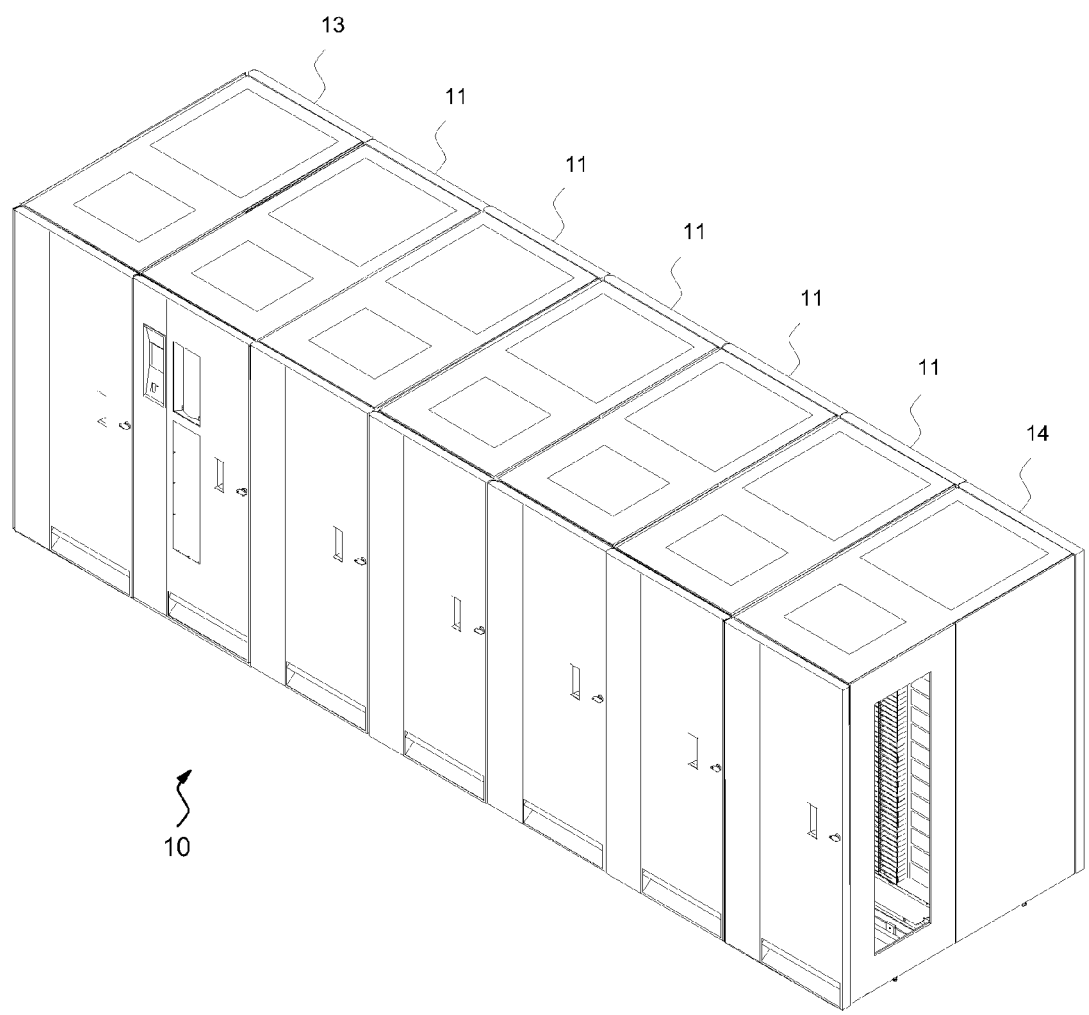
FIG. 1 is an isometric view of an automated data storage library adaptable to implement an embodiment of the present invention, with the view specifically depicting a library having a left hand service bay, multiple storage frames and a right hand service bay.
Figure 2:
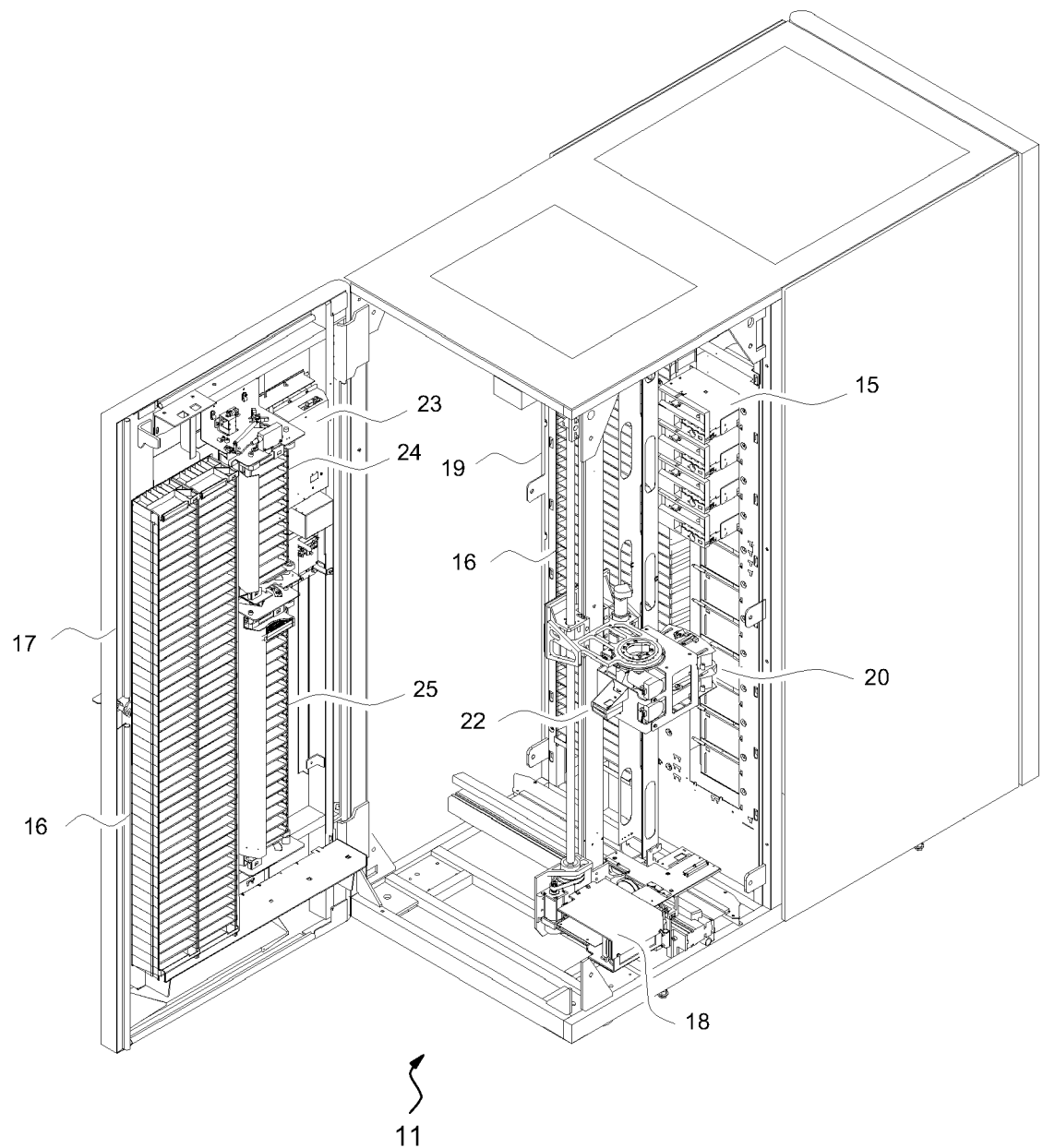
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM TS3500 tape library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration library 10 comprises storage frame 11 and there is only a single accessor (i.e., there are no redundant accessors) and there is no service bay. The library 10 is arranged for accessing data storage media in response to commands from at least one external host system (not shown), and comprises a plurality of storage shelves 16, on front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
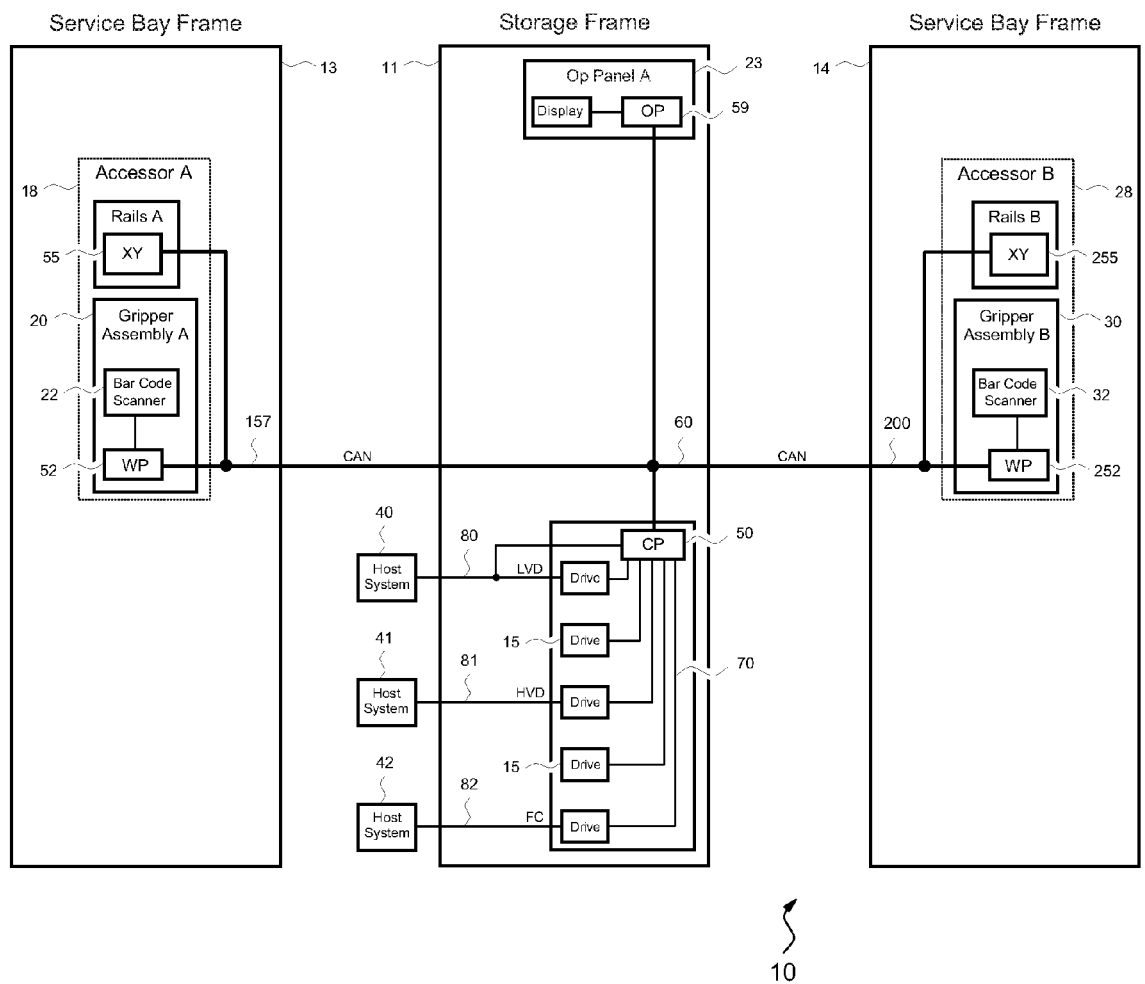
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which implement the present invention, is the IBM TS3500 tape library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
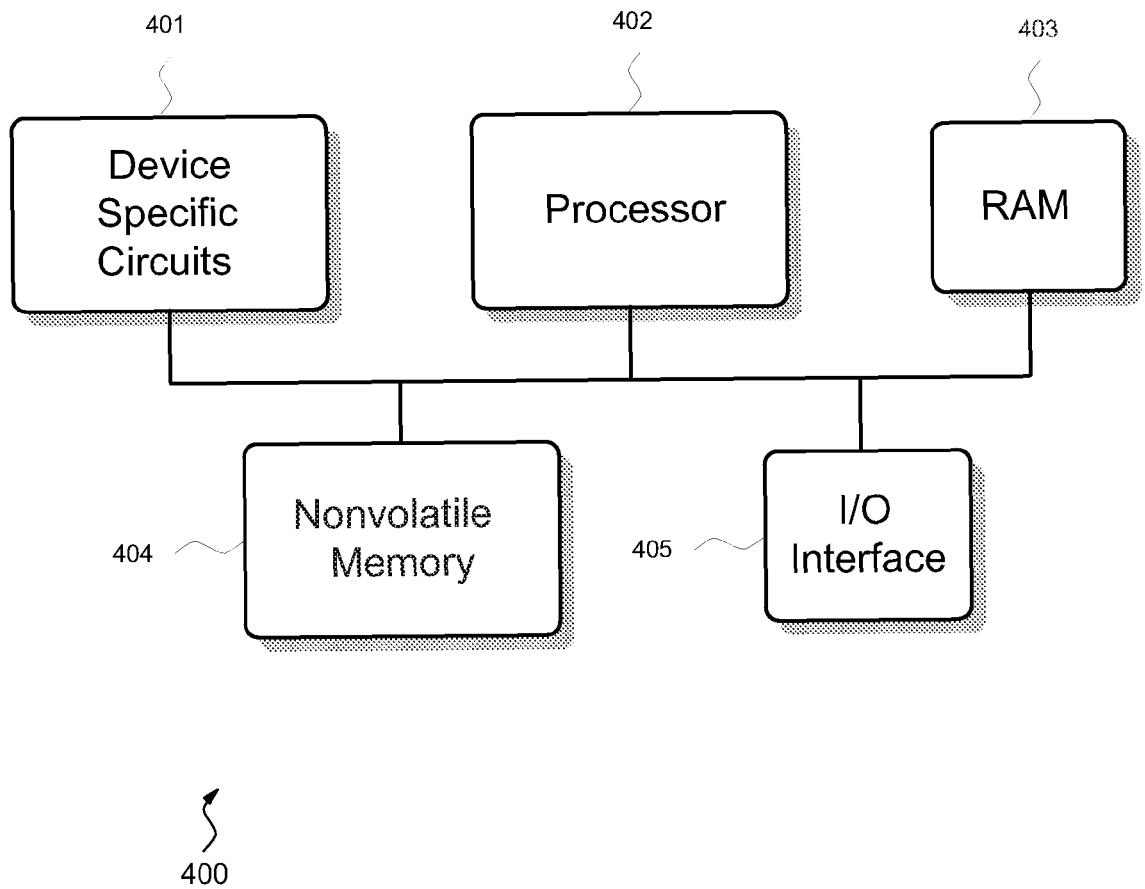
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), SCSI (Small Computer Systems Interface), SAS (Serial Attached SCSI), Fibre Channel, or Ethernet. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
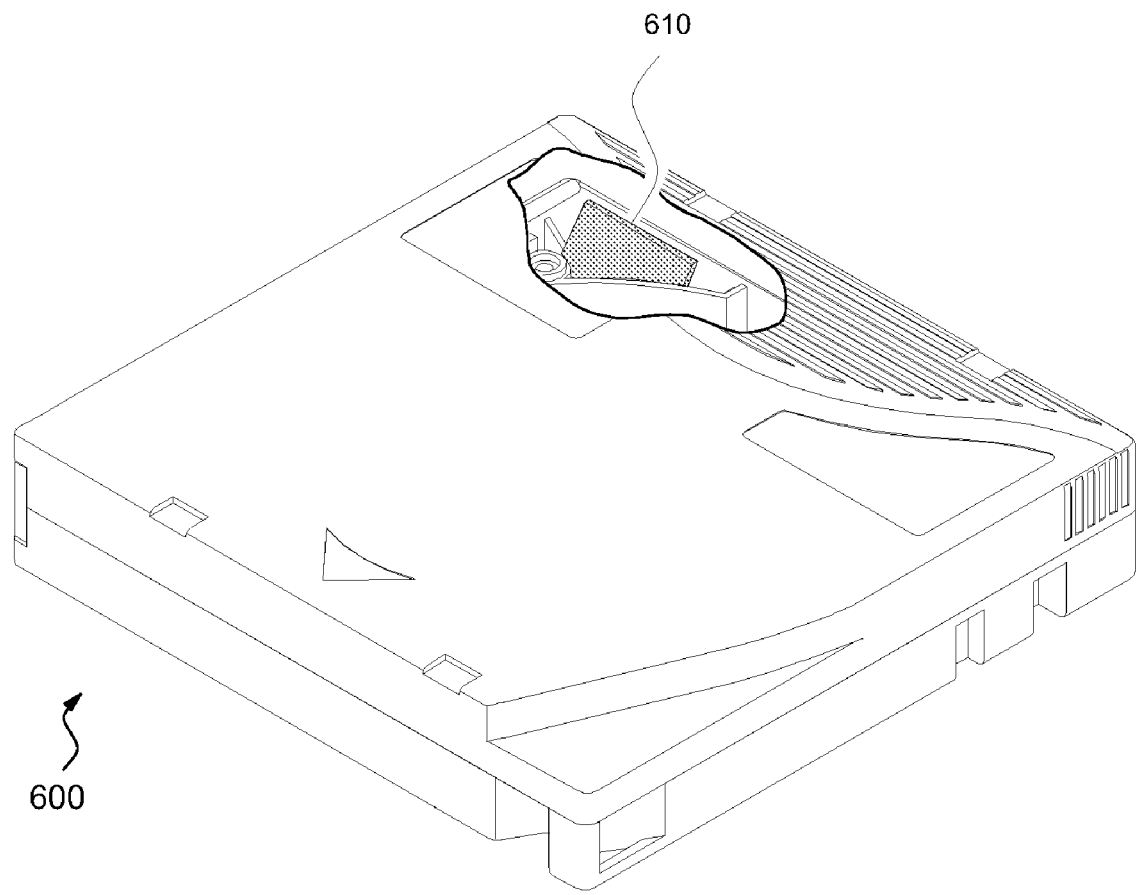
FIG. 6 is an isometric view of a data storage cartridge adaptable to implement an embodiment of the present invention.

FIG. 6 illustrates an embodiment of a data storage cartridge 600 with a cartridge memory 610 shown in a cutaway portion of the Figure. This is only an example and is not meant to limit the invention to cartridge memories. In fact, any configuration of data storage cartridge may be used whether or not it comprises a cartridge memory.

Figure 7A:
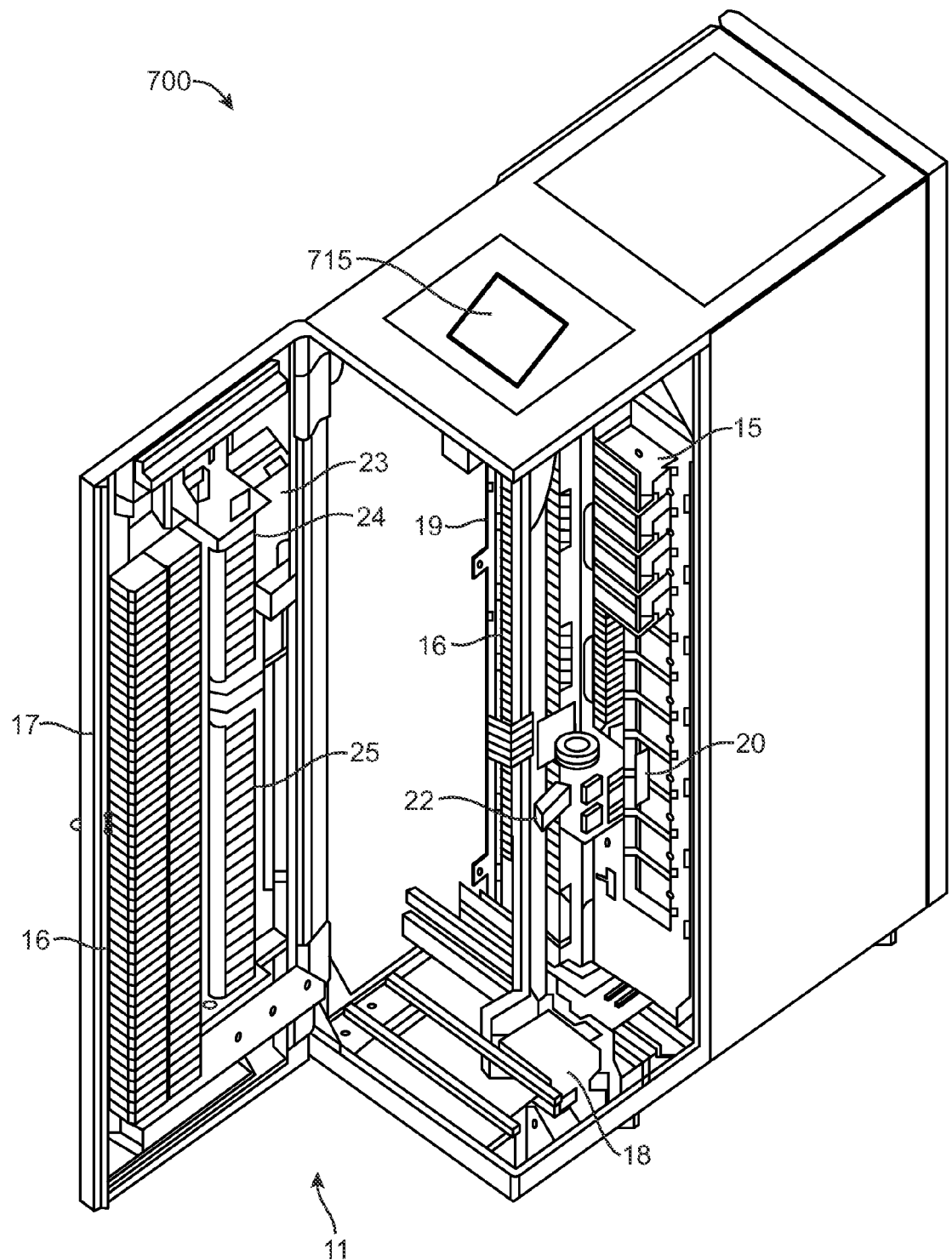
FIG. 7A is an isometric view of an automated data storage library in accordance with one aspect of the invention.

FIG. 7A illustrates a perspective view of one embodiment of a storage frame 700, in accordance with one aspect of the invention. Frame 700 includes the elements of frame 11 of FIG. 2, with an additional counter 715. Counter 715 is configured to determine the presence of cartridges stored within one or more deep cartridge slots, and in communication with a controller configured to count the number of cartridges and compare the counted number with a limit value. The limit value may include a predetermined capacity on demand value and/or a predetermined maximum value that allows the library to maintain a swap space. It may be desired to have more than the minimum required swap space to improve overall library performance. For example, there may be a swap space in each storage frame 11, one at each end of the library, one at the top and one at the bottom of each frame, etc. The counter 715 can be any appropriate device or combination of devices. In one embodiment, counter 715 includes an RFID reader, configured to interact with RFID tags implanted within each cartridge. In another embodiment, counter 715 includes a cartridge memory reader, configured to interact with the cartridge memory 610 of cartridge 600. In one embodiment, the counter 715 is positioned on the gripper 20 so the library can move the counter 715 to various locations within the library. In another embodiment, the counter 715 is located at a fixed location within the library. In another embodiment, there are a plurality of counters 715 located within the library 10. In one such embodiment, each of the plurality of counters 715 is in communication with a central controller (not shown), via a wired or wireless network for example, for maintaining a central count. In one embodiment, counter 715 includes one or more slot sensors. A slot sensor is a device that can tell the presence or absence of cartridges in a deep slot. The slot sensor may comprise an infrared emitter/detector, a hall effect sensor, or any other sensor for detecting the presence of objects as is known to those of skill in the art.

Figure 7B:
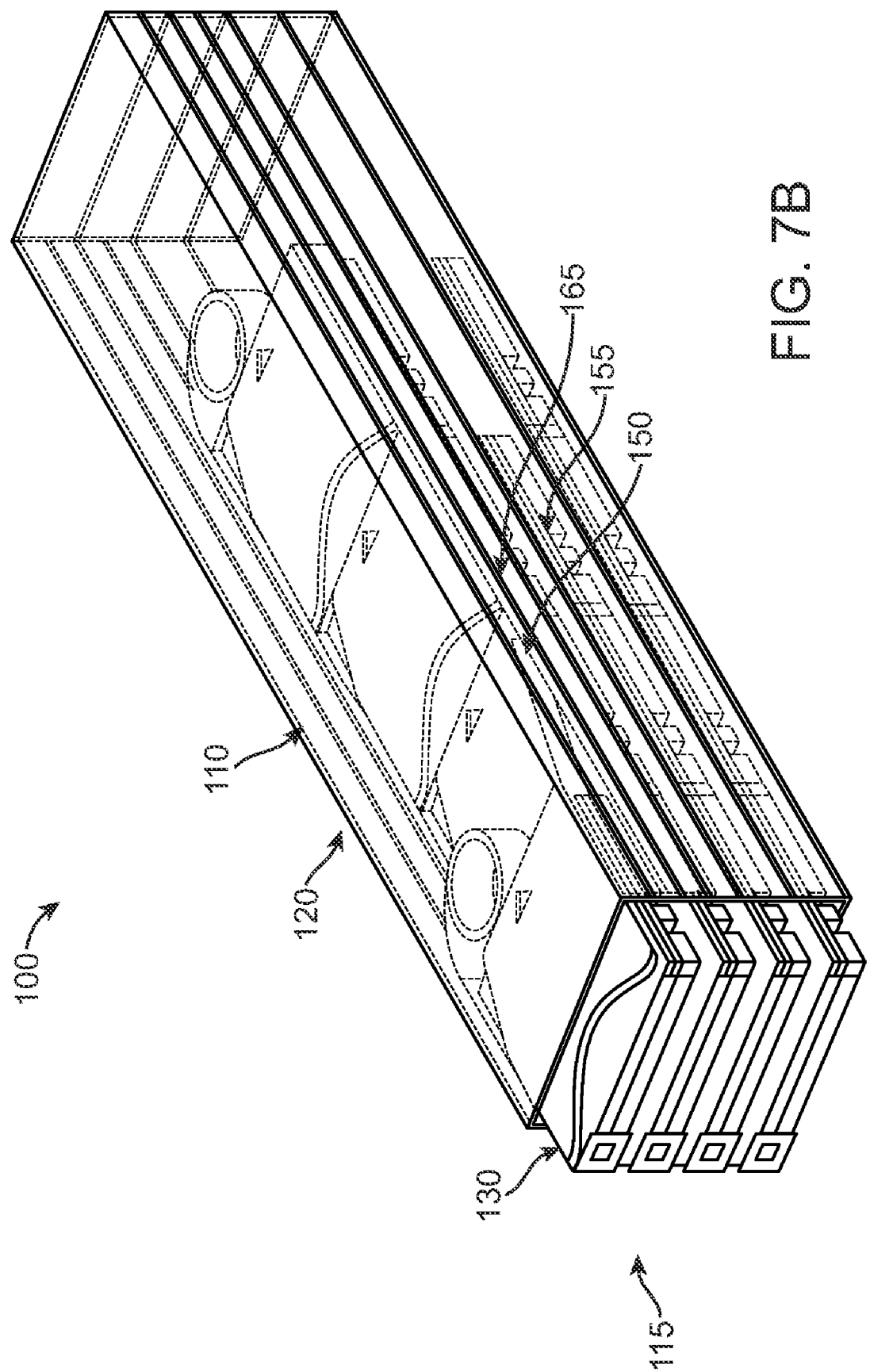
FIG. 7B is an isometric view of one example of an automated data storage library magazine, in accordance with one aspect of the invention

FIG. 7B illustrates a perspective view of one embodiment of a magazine 100 in accordance with one aspect of the invention. Magazine 100 includes a housing 110 defining an interior space 115. A plurality of storage slots 120 is disposed within the housing. Storage slots 120 are, in one embodiment, configured for holding a plurality of cartridges 130.

Additionally, in one embodiment, magazine 100 further includes at least one cartridge blocker 150. In such embodiments, the cartridge blocker 150 includes an external portion 155 outside of the interior space 115 and an internal portion 165 within the interior space 115. The cartridge blocker 150 alternates between an open position and a closed position, wherein the open position provides access to at least one of the storage slots 120, and wherein the closed position substantially prevents access to at least one of the storage slots 120. In one embodiment, the cartridge blocker is biased with a biasing member, such as a spring, toward the open position. In one embodiment, the cartridge blocker is biased with a biasing member, such as a spring, toward the closed position. In other embodiments, the cartridge blocker 150 is positioned with a locking member, such as a protrusion. In this example, the storage slots from top to bottom are considered to be in parallel. The storage slots from front to back, in one particular row, are considered to be in series. In one embodiment, storage slots that are arranged in series do not have a permanent physical barrier between them. In another embodiment, storage slots that are arranged in parallel have a physical barrier between adjacent storage slots. The physical barrier is used to prevent a cartridge from inadvertently passing from one slot to another slot. In one embodiment, the physical barrier can be moved or removed. In another embodiment, the physical barrier is maintained by a spring. In another embodiment, the physical barrier is maintained by a blocker. In another embodiment the physical barrier is fixed.

FIG. 8 illustrates one embodiment of a method 800 for providing data storage, in accordance with one aspect of the invention. Method 800 begins at step 810 by determining a capacity limit value associated with an allowed storage capacity. The capacity limit value is a predetermined number indicative of the allowed storage capacity. The actual value may be stored in nonvolatile memory so that it can be configured, changed, and retained. In one embodiment, a storage system includes more storage capacity than a user is licensed, or authorized to use. The amount of storage authorized for use by the user is the capacity of the storage system, while the excess is termed excess storage capacity or capacity on demand. A number of cartridges is counted at step 820. The count can be made using any appropriate device, such as a RFID device, a cartridge memory reader, slot sensors, etc. The counted number of cartridges is compared, such as with a processor, the library controller, ASIC, FPGA, discreet circuits, or other comparator, with the capacity limit value at step 830. In one embodiment, the comparison is made by library firmware. Based on the comparison, an excess storage message is issued at step 840. In one embodiment, the excess storage message is issued when the counted number of cartridges is greater than the capacity limit value. In another embodiment, the excess storage message is issued when the counted number of cartridges is greater than or equal to the capacity limit value. In one embodiment, the excess storage message is issued when the counted number of cartridges is within a predetermined difference of the capacity limit value. For example, if the comparison illustrates that the capacity limit value is less than 10% over the counted number of cartridges, an excess storage message can be issued so that the user becomes aware that their storage utilization is approaching a limit. The excess storage message can by any alert, such as a tone, indicator light, email, SMS (Short Message Service), SNMP (Simple Network Management Protocol) trap or notification, operator panel message, suspension of library access to certain cartridges or storage slots, reduced library functionality, or other form of message, notification, alert, or restriction. In one embodiment, the excess storage message traverses a network. In one embodiment, the excess storage message is posted to the user interface of the library. Reduced library functionality may comprise the inability to access certain library functions or capabilities. Data storage is then provided at step 850. Providing data storage refers to the library being ready to accept host commands.

In one embodiment, an RFID device and/or cartridge memory (CM) device monitors the insertion and withdrawal of cartridges and/or magazines from the library and keeps a running tally of the number of cartridges within the library to compare to the capacity on demand value. The RFID/CM device can be placed at any appropriate location to interact with cartridges entering and exiting the library. In one embodiment, the RFID/CM device is positioned near an entrance to the library, such as on front wall 17 (FIG. 2). In another embodiment, the RFID/CM device is positioned on the gripper 20. In another embodiment, the RFID/CM device is placed in or around the I/O station 24, 25. Still further, the RFID/CM device is positioned in each deep slot, around each group of deep slots, or in a location that can monitor or interact with all of the deep slots at once.

FIG. 9 illustrates one embodiment of additional method steps 900, in accordance with one aspect of the invention. In one embodiment, method 900 is implemented following execution of method 800. Method 900 begins at 910 by receiving an increase capacity message. The increase capacity message is a command to increase the capacity on demand value. In other words, the increase capacity message allows a user to take advantage of storage that is present but is not licensed or authorized to be used. In one embodiment, the increase capacity message is received from a vendor over a network in response to receipt of additional consideration. Additional consideration may comprise a credit card, a purchase order, a license key, etc. A vendor may comprise the manufacturer of the storage system, the company that sold the storage system, a company responsible for selling upgrades or features for the storage system, etc. In one embodiment, the increase capacity message is received directly at the library via a user interface. The increase capacity message includes an instruction indicative of the increment to increase the capacity limit value, and thereby providing capacity on demand. Based on receiving the increase capacity message, the capacity limit value is incremented at step 920, and the incremented capacity limit value may be compared to the counted number of cartridges at step 930. In one embodiment, if the counted number of cartridges remains greater than the incremented capacity limit value, an additional excess storage message is issued. In one embodiment, if the counted number of cartridges remains greater than or equal to the incremented capacity limit value, an additional excess storage message is issued. In yet another embodiment, if the counted number of cartridges remains within a predetermined margin (such as 5% or 10%) of the incremented capacity limit value, an additional excess storage message is issued.

FIG. 10 illustrates one embodiment of additional method steps 1000, in accordance with one aspect of the invention. In one embodiment, method 1000 is implemented following execution of method 800. In one embodiment, method 1000 is implemented as step 820 of method 800. Method 1000 begins at step 1010 by determining metadata for each cartridge within a library. The metadata can be determined with use of an appropriate device, such as an RFID reader, cartridge memory (CM) reader, etc. At step 1020, the determined metadata is listed, and at step 1030, the cartridges in the library are counted by referencing the list of determined metadata. Listing the metadata may comprise storing the metadata in volatile or nonvolatile memory such as RAM, EEPROM, flash PROM, CompactFlash, Secure Digital Media, hard disk drives, etc. In one embodiment, a database is created in steps 1010 and 1020 such that each cartridge is assigned a particular row or column in the database, and at step 1030, method 1000 determines the number of cartridges in the library as the number of rows or columns within the database. In one embodiment, the actual content of the metadata is not considered, and the metadata is only used, in the methods disclosed herein, to count the number of cartridges instead of cataloging their contents. In another embodiment, the metadata is used to identify particular cartridges that caused the excess storage message. For example, the cartridges occupying a fixed swap space, cartridges in excess of the capacity on demand value, cartridges in physical locations that have not been activated for capacity on demand, etc.

Figure 11:
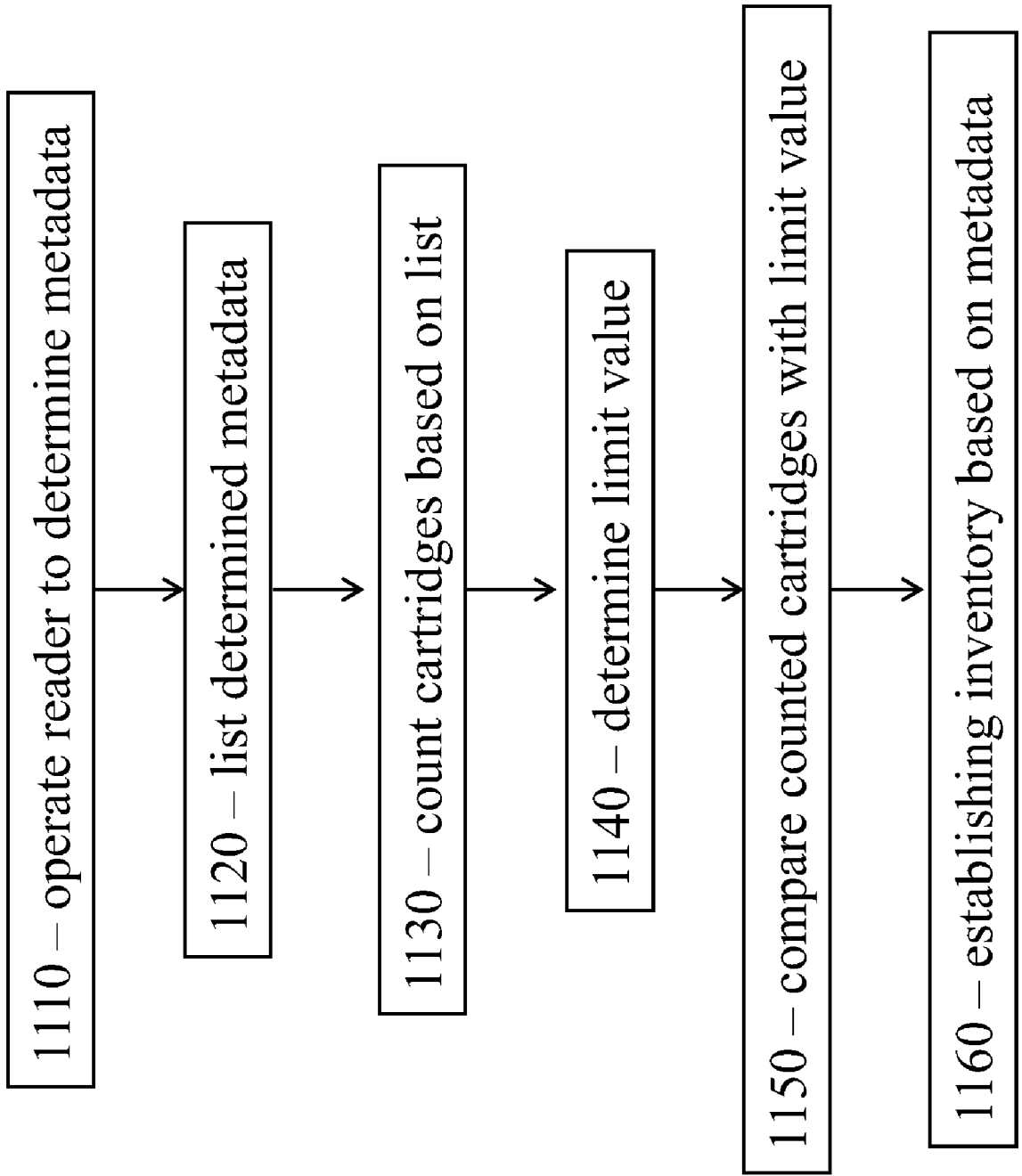
FIG. 11 illustrates one embodiment of a method for performing an inventory of cartridges in a data storage system in accordance with one aspect of the invention.

FIG. 11 illustrates one embodiment of a method 1100 to perform an inventory of cartridges in a data storage system, in accordance with another aspect of the invention. Method 1100 begins at step 1110 by operating a reader to determine metadata associated with each cartridge stored in a library. The reader can be any appropriate device, such as an RFID device, a cartridge memory reader, etc. The determined metadata is listed at step 1120, and at step 1130, the cartridges are counted based on the list. In one embodiment, a database is created in steps 1110 and 1120 such that each cartridge is assigned a particular row or column in the database, and at step 1130, method 1100 determines the number of cartridges in the library as the number of rows or columns within the database.

At step 1140, a capacity limit value is determined, and at step 1150, the determined number of cartridges is compared with the capacity limit value associated with a physical storage capacity. The physical storage capacity is indicative of the absolute number of cartridges that may be positioned within a library even if a user has not fully licensed that number of cartridges for storage. An inventory of cartridges is then established, at step 1160, based on the comparison. In one embodiment, an excess storage message is issued based on a determination that the number of cartridges is greater than the capacity limit value. In one embodiment, an excess storage message is issued based on a determination that the number of cartridges is greater than or equal to the limit value. In one embodiment, an excess storage message is issued based on a determination that the number of cartridges is less than the limit value, but within a predetermined range of the limit value, such as 5% or 10%.

In each of the methods described herein, a determination of sufficient deep slots can be further made, based on the comparison of the counted number of cartridges and the capacity limit value. In addition, as noted in the background, ensuring sufficient deep slot inventory is needed to ensure that the gripper has a swap space (a place to put any cartridges that must be moved to access deeper cartridges). Thus each method disclosed herein can further include an additional step, or alternatively describe another method, wherein the method determines a sufficient deep slot inventory based on the comparison. Further, error or warning messages can then be issued based on the determination of sufficient deep slot inventory for swap space, if there is insufficient deep slot inventory available.

While the figures and description of this invention have discussed the magazine in particular detail, it should be noted that other variations of the magazine may be employed without deviating from the scope of this invention. Indeed, the magazine may comprise any array of cartridge slots (x slots high, y slots across, z slots deep) in any orientation. For example, the magazine may comprise a 1, 5, 2 array where the magazine is 1 slot high, 5 slots wide, and 2 slots deep. In the example of FIG. 7B, the magazine array is arranged as 4, 1, 5. In addition, there is no requirement for the use of magazines. This invention applies to any deep slot structure, whether based on magazines or not.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A library comprising:
    a frame;
    a plurality of deep cartridge slots disposed within the frame;
    at least one counter configured to determine a presence of cartridges stored within the plurality of deep cartridge slots without removing the cartridges from the deep cartridge slots; and
    at least one controller in communication with the counter and configured to count a number of cartridges within the deep cartridge slots and compare the counted number to a limit value.

2. The library of claim 1 wherein the counter comprises at least one of an RFID reader, a cartridge memory reader, and one or more slot sensors.

3. The library of claim 1 wherein the limit value comprises at least one of a value that accounts for the presence of a swap space, a capacity on demand value.

4. The library of claim 1 wherein the library issues a message upon reaching a threshold between the counted number and a limit value.

5. The library of claim 4 wherein the message comprises at least one of an email alert, SNMP trap, SMS, pager message, operator panel message, indicator light, indicator sound, suspension of library access to certain cartridges, suspension of library access to certain storage slots, and reduced functionality of the library.

6. A method for providing data storage using a controller, the method comprising:
    determining a limit value, the limit value associated with an allowed storage capacity of a library;
    counting a number of cartridges stored in one or more deep cartridge slots within the library without removing the number of cartridges from their deep cartridge slots;
    comparing the counted number of cartridges with the limit value;
    issuing an excess storage message based on the comparison; and
    providing data storage.

7. The method of claim 6 further comprising:
    receiving at least one increase capacity message; and
    incrementing the limit value based on the received increase capacity message.

8. The method of claim 6 further comprising:
    determining at least one metadata associated with each cartridge within the library; and
    listing the determined metadata; and wherein counting the number of cartridges comprises accessing the list.

9. The method of claim 6 wherein counting a number of cartridges within the library comprises detecting the presence of each cartridge using at least one of an RFID reader, a cartridge memory reader, and one or more slot sensors.

10. The method of claim 7 wherein the message comprises at least one of an email alert, SNMP trap, SMS, pager message, operator panel message, indicator light, indicator sound, suspension of library access to certain cartridges, suspension of library access to certain storage slots, and reduced functionality of the library.

11. A method of establishing an inventory of cartridges in a data storage system using a controller, the method comprising:
- operating a reader to determine at least one metadata associated with each cartridge stored in one or more deep cartridge slots within a library without removing the each cartridge from their deep cartridge slots;
- listing the determined metadata;
- counting the stored cartridges based on the list;
- determining a limit value, the limit value associated with an allowed storage capacity;
- comparing the counted number of cartridges with the limit value; and
- establishing an inventory based on the metadata.

12. The method of claim 11 further comprising:
- issuing an excess storage message based on the comparison.

13. The method of claim 11 wherein the reader comprises at least one of an RFID reader, a cartridge memory reader, one or more slots sensors.

14. The method of claim 11 wherein the limit value comprises at least one of a value that accounts for the presence of a swap space, a capacity on demand value.

15. A computer usable storage medium including computer readable code for performing operations, the computer readable code comprising:
- computer readable code for determining a limit value associated with an allowed storage capacity;
- computer readable code for counting a number of cartridges stored within at least one deep slot without removing the number of cartridges from their at least one deep slot;
- computer readable code for comparing the counted number of cartridges with the limit value;
- computer readable code for issuing an excess storage message based on the comparison; and
- computer readable code for providing data storage, the computer readable code for providing data storage being processed by a controller.

16. The medium of claim 15 further comprising:
- computer readable code for receiving at least one increase capacity message; and
- computer readable code for incrementing the limit value based on the increase capacity message.

17. The medium of claim 15 further comprising:
- computer readable code for determining at least one metadata associated with each cartridge stored in the at least one magazine; and
- computer readable code for listing the determined metadata; and wherein counting the number of cartridges comprises accessing the list.

18. The medium of claim 15 wherein the limit value comprises a capacity on demand value.

19. The medium of claim 15 wherein the limit value comprises at least one of a value that accounts for the presence of a swap space, a capacity on demand value.

20. The medium of claim 15 wherein counting a number of cartridges comprises detecting the presence of a cartridge by using at least one of an RFID reader, a cartridge memory reader, one or more slot sensors.

* * * * *